United States Patent

[11] 3,543,874

| [72] | Inventor | Leslie James Nevett<br>Whalley, England |
|---|---|---|
| [21] | Appl. No. | 738,582 |
| [22] | Filed | June 20, 1968 |
| [45] | Patented | Dec. 1, 1970 |
| [73] | Assignee | Joseph Lucas Industries Limited<br>Birmingham, England |
| [32] | Priority | June 26, 1967 |
| [33] | | Great Britain |
| [31] | | No. 29338/67 |

[54] MEANS FOR MOUNTING CONTROLS IN A ROAD VEHICLE
1 Claim, 2 Drawing Figs.

[52] U.S. Cl. .................................................. 180/78, 74/498
[51] Int. Cl. .................................................. B62d 1/16
[50] Field of Search ........................................ 180/78; 74/496, 498

[56] References Cited
UNITED STATES PATENTS

| 1,795,566 | 3/1931 | MacComb .................. | 180/78 |
| 2,468,314 | 4/1949 | Vogel ......................... | 180/78UX |

*Primary Examiner*—A. Harry Levy
*Attorney*—Holman, Glascock, Downing & Seebold

ABSTRACT: Means for mounting controls in a road vehicle includes a gear train which is engaged at one end with the steering shaft of the road vehicle. A gear supporting assembly is rigidly secured to the body of the road vehicle, and a panel supporting controls of the road vehicle is fixed relative to the support assembly. A steering wheel encircles the panel and is engaged with the other end of said gear train for rotation relative to the support assembly. The steering wheel is coaxial with the steering shaft, and the gear train is such that rotation of the steering wheel in one direction causes rotation of the steering shaft in the same direction.

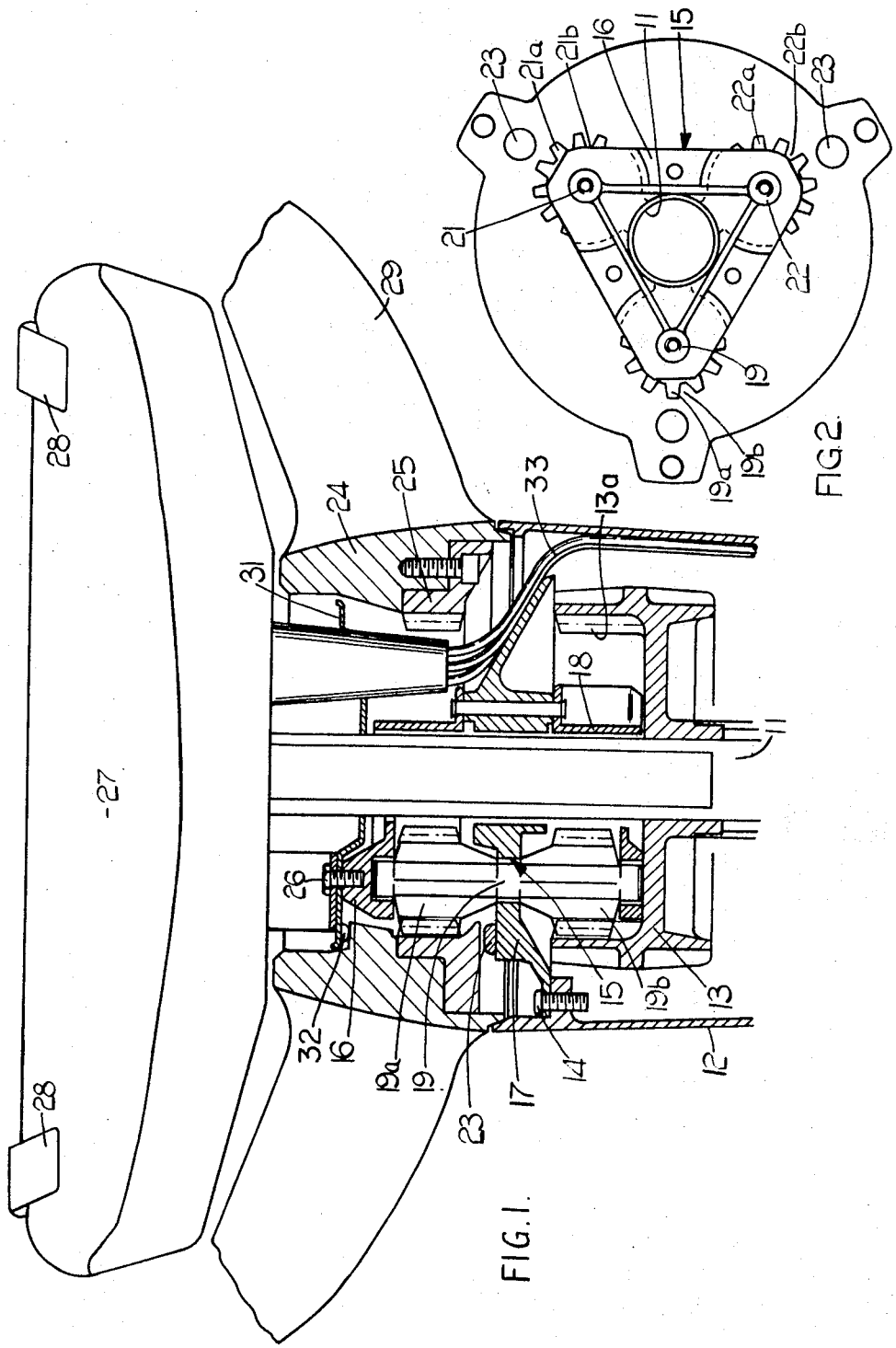

MEANS FOR MOUNTING CONTROLS IN A ROAD VEHICLE

This invention relates to means for mounting controls in a road vehicle.

Means according to the invention includes a gear train engaged at one end with the steering shaft of the road vehicle and having a gear supporting assembly rigidly secured to the road vehicle body, a panel supporting controls of the vehicle and fixed relative to said support assembly and a steering wheel encircling said panel and engaged with the other end of the gear train, for rotation relative to said support assembly, the steering wheel being coaxial with the steering shaft and the gear train being such that rotation of the steering wheel in one direction causes rotation of the steering shaft in the same direction.

One example of the invention is illustrated in the accompanying drawings wherein:

FIG. 1 is a fragmentary view of part of the steering assembly of a road vehicle, and FIG. 2 is a plan view of part of the gear assembly shown in FIG. 1.

Referring to the drawings, the steering shaft 11 of the road vehicle extends at one end into the passenger compartment of the road vehicle and is surrounded by a fixed nacelle 12. Secured to the free end of the shaft 11 is a moulded gear wheel 13 having formed thereon a plurality of internal gear teeth 13a. Secured to the nacelle 12 by screws 14 is a gear assembly 15 comprising a central annular carrier member 17 having secured thereto a pair of end carrier members 16, 18. The members 16, 17, 18, support three moulded shafts 19, 21, 22 which extend parallel with the shaft 11. Intermediate the members 16, 17 and the members 17, 18 the shafts 19, 21, 22 each have integral therewith moulded pinions suffixed in the drawings by the letters a and b, the pinions 19b, 21b, 22b being engaged with the internal teeth of the gear wheel 13.

Rotatably supported on the member 17 through nylon bearing inserts 23 is an annular boss 24 having secured thereto an annular moulded gear wheel 25. The gear wheel 25 is also formed with internal teeth and is engaged with the pinions 19a, 21a, 22a, so that rotation of the boss 24 is transmitted to the shaft 11 through the gear train 25, 19a, 19b, 21a, 21b, 22a, 22b and 13.

Nonrotatably mounted on the member 16 through bolts 26 is a panel 27 which carries controls in the form of switches 28 for controlling various electrical circuits of the vehicle. Extending radially outwardly from the boss 24 are arcuate arms (one of which is shown at 29) which are interconnected at their free ends by a steering wheel (not shown). Moreover, trapped between the member 16 and the panel 27 is an annular plate 31 which constitutes a cover for the gear train to prevent ingress of dirt into the gear train and which furthermore carries nylon bearing inserts 32 which ride on the boss 24 and prevent the boss 24 and the steering wheel being moved axially or being tilted relative to the gear train. Thus, it will be appreciated that although the steering wheel encircles the panel 27, coaxial with the shaft 11, the panel 27 does not rotate when the steering wheel is moved to steer the vehicle.

The leads 33 from the controls on the panel 27 extend between the gear train and the nacelle 12 for connection to the vehicle wiring harness.

I claim:

1. Means for mounting controls in a road vehicle including:

a gear train supporting assembly;

means rigidly securing the gear train supporting assembly to the road vehicle body;

a gear train carried by said gear train supporting assembly;

means coupling one end of said gear train to a steering shaft of the road vehicle;

a panel supporting controls of the vehicle;

means fixing the panel relative to the gear train support assembly;

a steering wheel encircling said panel;

means coupling the steering wheel with the other end of said gear train, for rotation relative to said gear train support assembly, with the steering wheel coaxial with the steering shaft;

said gear train including;

a first internal ring gear rotatable with the steering wheel of the road vehicle;

a second internal ring gear axially spaced from the first internal ring gear and rotatable with the steering shaft of the vehicle; and first, second and third shafts each carrying a first pinion mating with the first internal ring gear, and a second pinion engaged with said second internal ring gear so that said three shafts transmit rotation of said steering wheel to said steering shaft.